Patented Feb. 3, 1948

2,435,412

UNITED STATES PATENT OFFICE 2,435,412

PLASTICIZED NATURAL RESIN MATERIAL

Frank J. Soday, Swarthmore, Pa., assignor to The United Gas Improvement Company, a corporation of Pennsylvania No Drawing. Application October 22, 1942, Serial No. 462,995

11 Claims. (Cl. 106—240)

The present invention relates to new compositions of matter and to methods for their preparation.

More particularly, this invention pertains to the use of the high-boiling aromatic oil separated from tar formed during the production of combustible gas by processes involving the pyrolytic decomposition of petroleum oil with or without the aid of catalysts as plasticizing agents for natural resins and/or resinous derivatives of natural resins such as esters of natural resins.

The natural resins and their resinous derivatives referred to herein are distinguished from rubbers, in that they have definite and reproducible softening points and are compatible with drying oils, while rubbers are not.

It is the object of the present invention to provide new compositions of matter comprising high-boiling aromatic oil separated from petroleum oil gas tar and one or more natural resins and/or resinous derivatives of natural resins. Another object of the invention is the provision of a high-boiling aromatic oil which is suitable for use alone or in combination with other substances as a softener or plasticizing agent for coating compositions containing one or more natural resin and/or resinous derivatives of natural resins. A further object of the invention is the provision of new molding compositions comprising a high-boiling aromatic oil in combination with one or more natural resin and/or resinous derivatives of natural resins. Other objects and advantages of the invention will be apparent to those skilled in the art from the following description.

A feature of the invention is the provision of adhesives, paper and textile treating agents, leather treating agents, special inks, binders, coating and impregnating compositions, putties, sealing agents, and the like, comprising one or more natural resin and/or resinous derivatives of natural resins and an aromatic oil of the type described.

For convenience in description the natural resins and their resinous derivatives will be generally referred to herein as natural resin material unless it is desired to distinguish particularly a specific resin or class of resins within the broad group.

Other ingredients, such as waxes, rubber, both natural and synthetic elastomers in general, derivatives of rubber or elastomers, drying oils, pigments, extenders, fillers, organic dyes and coloring agents, driers, and solvents may be incorporated in compositions of the type described for specific applications, if desired.

While the use of certain aromatic hydrocarbons such as naphthalene, anthracene, and phenanthrene have been suggested for use as plasticizers for certain synthetic resins, such as polystyrene, the use of such aromatic hydrocarbons for this purpose has not met with general acceptance in the industry. This has been due mainly to the fact that such crystalline materials tend to volatilize or sublime from the surface of the resin or plastic with which they have been incorporated, thus impairing or destroying the transparency and/or finish of the article or object in question.

I have discovered that aromatic hydrocarbon oil boiling above 210° C., said oil having been separated from tar produced during the production of gas by a process involving the pyrolytic decomposition of petroleum oil with or without the aid of catalysts, is unusually well adapted as a softening agent for natural resin material.

Such high-boiling aromatic oils are preferred, which have a preponderant portion boiling above approximately 250° C.; still more preferred are those having a preponderant portion boiling above approximately 275° C.; even more preferred are those having a preponderant portion boiling above approximately 300° C.; and especially preferred are those having a preponderant portion boiling above approximately 325° C. For certain purposes, it may be preferred to employ high-boiling aromatic oils of this type which boil substantially within certain ranges, for example, between 225 and 450° C., more preferably between 300 and 450° C., and still more preferably between 325 and 450° C., though for other purposes relatively narrow cuts confined to the lower boiling ranges may be preferred.

The excellent results obtained when such aromatic oils are used as plasticizing and/or softening agents for natural resin material are due largely to the exceptional solubility and low volatility characteristics of such oils, as well as to their excellent compatibility with natural resin material generally. Their solubility characteristics are of particular value when preparing resin-plasticizer compositions of this type, largely reducing the time ordinarily required to prepare such blends.

In addition, the exceptionally low viscosity characteristics of aromatic oils of the type described greatly assists in the blending operations, and insures rapid and complete penetration.

Aromatic oils of the type described are exceptionally stable, and are strongly resistant to decomposition, thus insuring the production of uniform compounds and finished articles free from decomposition products. Such compounds, and the finished articles prepared therefrom, possess very good aging characteristics.

Aromatic oils of the type described herein are extracted and/or distilled products, consequently they contain very little, if any, free carbon or other extraneous materials. This is of considerable importance from the standpoint of the preparation of clean, uniform resin-plasticizer compositions.

It has been discovered that very considerable quantities of high-boiling aromatic oils of the type described are contained in the tar produced in the vapor phase pyrolysis of crude petroleum oil or a fraction or fractions thereof such as, for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and at close to atmospheric pressures and also particularly so when the oil pyrolyzed is naphthenic, such as a crude oil classifiable in classes 5 to 7 inclusive, according to the method of classification of the Bureau of Mines or a fraction or fractions of such an oil.

Recently, methods have been developed for the recovery of unusually large quantities of aromatic hydrocarbon boiling in the ranges set forth, from petroleum oil gas tar, produced in the manufacture of gas, such for example, as carburetted water gas, oil gas, or the like. These methods recover high-boiling aromatic oils which are unique in character. The usual distillation procedures employed for the purpose of petroleum tar dehydration and fractionation have been such as to polymerize the readily heat polymerizable monomers boiling above 210° C., which are frequently present in large proportions, into heavy polymers, which became inextricably mixed with the heavy black pitch constituents and with the higher-boiling non-heat polymerizable aromatic oils present. As a result, the high-boiling non-heat polymerizable aromatic oils were retained by the residual tar or pitch.

In copending application Serial Number 370,608, filed December 18, 1940, by Edwin L. Hall and Howard R. Batchelder, which has matured into Patent 2,387,259, granted October 23, 1945, the high-boiling aromatic hydrocarbon oils containing heat polymerizable monomeric aromatic hydrocarbons boiling above 210° C. and separated from the heavy black pitch constituents of the petroleum tar are described and claimed, together with heat polymers produced from said polymerizable oils.

In copending application 386,232, filed April 1, 1941, by Waldo C. Ault, which has matured into Patent 2,387,237, granted October 23, 1945, there is described and claimed the production of catalytic resins from the heat polymerizable and/or catalytically polymerizable monomeric hydrocarbons boiling above 210° C. and separated in monomeric form from the heavy black pitch constituents of the petroleum tar.

The high-boiling aromatic oils of the type described may be isolated from the resins obtained from each of these processes.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, which has matured into Patent 2,366,899, granted January 9, 1945, there is described a method of dehydrating such petroleum tar emulsions and of fractionating the hydrocarbon constituents thereof by rapid distillation with the separation from the heavy pitch constituents of residual tar of a mixture of aromatic hydrocarbons and heat polymerizable unsaturated monomeric aromatic hydrocarbons boiling above 210° C.

In copending application 353,034, filed August 17, 1940, by Howard R. Batchelder, which has matured into Patent 2,383,362, granted August 21, 1945, there is described the dehydration of such petroleum tar emulsions and the fractionation of the hydrocarbon constituents thereof with the recovery of monomeric unsaturated heat polymerizable hydrocarbon constituents and aromatic oils separate from the heavy black pitch constituents of residual tar, by the solvent extraction of the emulsion with a hydrocarbon solvent such as liquefied propane or butane.

Other processes, for example fractional condensation, might be employed to recover these high boiling aromatic hydrocarbons separate from the heavy black pitch constituents of the tar. Also processes for oil pyrolysis which avoid the formation of emulsions, may be employed for the production of the high-boiling aromatic hydrocarbons. Furthermore, while it may be preferred to employ petroleum oils or cuts therefrom, which are classifiable in classes 5 to 7 inclusive according to the method of classification of the Bureau of Mines, and particularly in class 7, other oils may be employed.

As a result of separation of the light oil and higher-boiling aromatic oil components of the products of such petroleum oil pyrolysis from the residual tar, without polymerization or with materially reduced polymerization, a substantially pitch-free highly aromatic hydrocarbon material may be separated having a portion boiling within the range of from 210 to 450° C., or higher, which may contain from 5% to 30%, and higher, of monomeric unsaturated aromatic hydrocarbons readily polymerizable by heat.

As previously stated, the above mentioned heat polymerizable highly aromatic monomeric material may be readily polymerized by heat to form resins, after which the high-boiling aromatic hydrocarbons may be separated from such resins by any desired method, such as by distillation, which may be assisted by steam and carried out under reduced pressures.

Polymerization may be effected by heating the total material separated from the residual tar sufficiently to polymerize the readily heat polymerizable monomers boiling within the range of from 210° to 450° C., but insufficientlty to appreciably polymerize the heat polymerizable material contained in lower boiling ranges, such, for instance, as methyl styrenes and styrene. This may be accomplished, for example, by heating with stirring for 4 hours at 200° C., followed by distillation under vacuum to isolate the resin. The higher-boiling aromatic oils then may be separated by fractional distillation.

It may be preferable, however, to first effect a separation by fractional distillation between light oil boiling below say 210° C. and oils boiling above say 210° C.

The polymerization of the heat polymerizable unsaturated monomeric material in the separated aromatic oils boiling above, say 210° C. may be effected by heating the oil with stirring, for example, for four hours at 200° C.

The resin thus produced, together with any resin produced during the separation of the light oil from the higher-boiling oil, may then be removed by distillation under vacuum.

As hereinbefore stated, after polymerization the high-boiling aromatic oils may be isolated from the resin by distillation in vacuum, which may be assisted by steam.

The high boiling polymerizable monomeric material derived from tar obtained in the pyrolysis of petroleum, by rapid distillation or solvent extraction methods also may be polymerized prior to the separation of the desired high-boiling aromatic oils by the application of certain catalysts, either with or without the simultaneous, or otherwise, application of heat, for example as described and claimed in the above copending application, Serial No. 386,232, filed April 1, 1941, by Waldo C. Ault.

Catalysts such as mineral acids, for example, sulfuric acid, hydrogen chloride, acids of phosphorus, or acid-acting metallic halides or complexes of said halides, preferably organic solvent complexes, as for example, borin trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid-acting metallic halides.

While high-boiling oils of the type described may be isolated from the tar emulsion by either distillation or solvent extraction methods, as pointed out previously, I prefer to employ high-boiling oils which have been isolated by solvent extraction methods because of the presence therein of very much larger proportions of high-boiling aromatic oils of the type desired. The flash-distillation method of isolating such oils from the tar emulsion may permit the polymerization of a portion of the unsaturated materials to take place, though very greatly less than when using conventional methods, thus increasing the quantity of resinous and/or pitch-like materials present. The presence of these polymers reduces the quantity of the aromatic oils, and particularly those having the higher boiling ranges, which may be isolated from the residual tar or pitch.

While aromatic oils boiling above 210° C. may be produced by conventional methods of distillation of the products of vapor phase oil pyrolysis produced in the manufacture of gas, and may be employed in accordance with the present invention, such aromatic oils are by no means as preferred for this purpose, as are the high-boiling aromatic oils produced by the use of separation methods, which minimize polymerization of the high-boiling heat polymerizable unsaturates.

In conventional distillation methods, the tars are subjected to elevated temperatures for such lengths of time as to polymerize the far greater part, if not all, of the high-boiling heat polymerizable unsaturates. This results in the production of a very highly viscous mass, from which the removal of the higher-boiling non-heat polymerizable aromatic constituents by commercially feasible methods is precluded by very great operating difficulties.

The processes, which minimize or avoid polymerization in the separation of the high-boiling aromatic oil from the tar, thus produce high-boiling aromatic oils which differ from those produced by conventional processes not only in their content of high-boiling heat polymerizable unsaturates, but also in their content of the higher-boiling non-heat polymerizable aromatic constituents. The high-boiling aromatic oils produced by these methods are therefore unique.

In connection with the isolation of these high-boiling aromatic oils by the preferred method, namely, by the solvent extraction of the tar emulsion, it should be emphasized that the mixture of aromatic oils and unsaturated oils obtained by such methods may be fractionally distilled prior to, during, or after polymerization to isolate the aromatic oils having the desired high-boiling range. Separation by distillation prior to polymerization may be preferred in certain cases for reasons more particularly set forth in said copending applications.

Thus, the extracted oils may be distilled prior to polymerization to give a fraction boiling above, say for example 275–300° C., and a lower boiling fraction. These may be polymerized separately, after which the high-boiling aromatic oils of the type desired may be isolated from the resinous materials obtained.

The process may be further illustrated by the following examples.

*Example 1*

Petroleum oil gas tar emulsion obtained by the pyrolysis of a Bureau of Mines type 7 naphthenic oil in the presence of steam in a ceramic chamber at temperatures above 1300° F. is extracted with liquid propane. After removal of the propane, the extracted oil is flash distilled to give a fraction boiling almost entirely above 250° C.

This fraction is polymerized by heating to a temperature of 200° C. for a period of 4 hours after which the aromatic oils are isolated by distillation until a vapor temperature of approximately 200° C., or higher, is reached at a pressure of 20 mm. of mercury, absolute.

*Example 2*

A sample of extracted and distilled oil similar to that employed in Example 1 is polymerized by the addition of 96% sulfuric acid in small portions at temperatures below 50° C. until no further temperature rise is noted. The addition of 1% by weight of acid usually is sufficient to insure complete polymerization.

The acid sludge layer then is removed, either with or without the addition of naphtha to reduce the viscosity of the mixture, and the polymerized material washed and neutralized. The high-boiling aromatic oils then are isolated by distillation under reduced pressure.

*Example 3*

A sample of extracted and distilled oil similar to that employed in Example 1 is polymerized by the addition of 3% by weight of aluminum chloride-diethyl ether complex at temperatures below 50° C. After the polymerization has been completed, the catalyst is neutralized by the addition of an aqueous alkaline solution. Clay or other desired filter aid then is added and the mass filtered. The filtered material is distilled under reduced pressures to isolate the high-boiling aromatic oils.

Any combination of the foregoing or other methods may, of course, be employed to isolate the high-boiling aromatic oils.

The oils obtained may be employed in natural resin material compounds or blends without further treatment with excellent results. However, if desired, they may be further refined or treated by any desired method.

Thus, the high-boiling aromatic oils may be refined by washing with one or more portions of sulfuric acid, preferably of 96% concentration, until all, or substantially all, of the colored bodies are removed. The oil then may be contacted with clay or other surface-active agents, if desired, to remove any remaining impurities. Oils ranging in color from a light yellow to water white are readily obtained in this manner, the exact color of the oil obtained depending, among other things, upon the severity of the refining operation employed.

Other refining methods may, of course, be employed if desired, either alone or in conjunction with acid washing, or otherwise. Thus, the high-boiling aromatic oils may be contacted with, or percolated through, activated clay or other surface active agent.

I have discovered that aromatic oils of the type described herein should preferably have the preponderant part thereof boil above at least 250° C., and more particularly above at least 275° C., in order to insure the production of natural resin material compositions having unusually desirable properties. Excellent results are obtained when aromatic oils of the type described having the preponderant part thereof boiling above at least 300° C., more particularly above 325° C. and still more particularly above 340° C., are employed.

In addition, such oils are preferred which have mixed aniline points below 15° C., and more particularly below 10° C. A mixed aniline point of a given oil is defined as the critical solution temperature of a mixture of 10 cc. of anhydrous aniline, 5 cc. of the oil being tested, and 5 cc. of a naphtha having a straight aniline point of 60° C.

Such oils are preferred which have not less than 95%, and more particularly not less than 97%, of aromatic content to insure complete compatibility with certain natural resin material.

Such oils are preferred which have densities not less than 0.95 and, more particularly, not less than 0.98.

These values represent preferred characteristics for aromatic oils of the type described herein for employment in natural resin material compositions.

Excellent results have been obtained employing high-boiling aromatic oil produced under such conditions of oil pyrolysis and under such conditions of separation from the resulting petroleum oil gas tar, that the material boiling above 210° C., when and as separated from the pitch constituents of the tar, contained at least 5%, and preferably at least 10% and still more preferably at least 20% or higher of heat polymerizable unsaturates.

As pointed out previously, high-boiling aromatic oils of the type described which have been found to be particularly adapted for use as a softener and/or plasticizing agent for natural resin material may be isolated from the tar or tar emulsion obtained as a result of the pyrolytic decomposition of petroleum, or a fraction thereof, by the flash distillation or more preferably the solvent extraction of the tar or tar emulsion. The extract obtained may be separated into a high-boiling and a low-boiling fraction, if desired, after which the high-boiling fraction, or the overall extract, may be subjected to polymerization to remove the unsaturated materials present. The oil obtained from such operations then may be refined, such as by sulfuric acid washing and/or other refining operations, after which the oil may be used as such, or it may be further distilled and/or fractionated, or it may be processed otherwise.

The oil obtained from the polymerizing operation, after separation of the polymers, also may be used as such without further refining, and such unrefined oil may be fractionated prior to use, if desired.

The oil obtained from the polymerizing operation also may be treated with clay or other surface active agent, either before or after separation from the polymers, followed by filtration and/or distillation, if desired. Successive clay treatments may be employed.

The mixture of oil and resin obtained from the polymerizing operation also may be used as such for the preparation of natural resin material compositions, and such mixture may be refined such as by clay contacting prior to use if desired.

The oil separated from the tar or tar emulsion by flash distillation or preferably by solvent extraction methods followed by distillation to separated materials boiling below 250° C. or, more particularly, below 275° C., or still more particularly below 300° C., if desired, and containing higher-boiling aromatic hydrocarbons and unpolymerized or partially polymerized unsaturated aromatic hydrocarbons, may be used as such for the preparation of natural resin material compositions, or it may be refined by any desired method such as clay contacting prior to use.

As the unpolymerized aromatic material present in such mixture is extremely heat sensitive, practically all of the unsaturated aromatic hydrocarbons present may be, if desired, converted to resinous polymers during the mixing, blending, or other operations incident to the preparation of the natural resin material composition.

Accordingly, the mixture of aromatic hydrocarbons including unsaturated aromatic hydrocarbons obtained from the tar or tar emulsion by flash distillation or preferably by solvent extraction methods followed by distillation may be used as such for the preparation of compositions of the type described herein, provided preferably however that the preponderate portion thereof boils above 250° C., or such mixture may be partially or completely polymerized prior to use. The partially or completely polymerized mixture also may be distilled to remove a part or all of the resinous polymer, after which the distillate may be distilled and/or refined if desired prior to use.

The invention in its broad aspect, therefore, includes the employment of a high-boiling aromatic oil of petroleum oil gas tar origin of the type described as an ingredient in natural resin material compositions either in admixture or not with unsaturated aromatic hydrocarbons boiling in the same or neighboring boiling ranges and/or resinous polymers derived from such unsaturated aromatic hydrocarbons.

Examples of natural resins and resinous derivatives of natural resins are non fossil resins such as rosin, elemi, shellac, chicle, sandarac, fresh copal, fresh dammar, fresh kauri, fresh pontianac; semi fossil resins such as semi fossil copal, kauri, dammar, pontianac; fossil resins such as fossil kauri, copal, dammar, amber and pontianac; natural resin derivatives such as hardened resins and run resins of the above varieties and others, esters of resins of the above varieties and others such as rosin esters including ester gum, esters of copal, dammar, pontianac, kauri, sandarac, elemi, shellac, chicle, amber and others; hydrogenated esters of the above various natural resins and others; chlorinated natural resins of the above varieties and others, especially if compatible with cellulose derivatives such as cellulose acetate.

Esters may be prepared by esterification of individual natural resins or mixed resins. Hardening and running may be carried out before or after esterification, or otherwise, and may be carried out with mixed resins or resin esters.

The various natural resins may be esterified according to known methods with polyhydric alcohols, such as glycerol, polyglycerol, glycols, with aliphatic monohydric alcohols, with phenols and naphthols and with high boiling esters to bring about interchange of groups between the resin acid and the ester and otherwise.

The esterification may if desired be carried out in the presence of a drying oil such as linseed oil or tung oil.

Running may be accomplished in any desired manner, such as by heating in a suitable container until the desired degree of oil compatibility, or other desired characteristics, have been imparted to the resin or mixture of resins.

In general, aromatic oils of the type described are added to natural resin materials to (1) improve their flexibility, (2) reduce their softening point, (3) reduce their viscosity, (4) improve their working properties, and/or (5) impart tackiness and improve the adhesive properties of the resin.

Other plasticizing agents may be used in conjunction with aromatic oils of the type described herein.

However, I generally prefer to employ aromatic oils of the type described herein alone as plasticizing agents for natural resin material. When one or more secondary plasticizing agents are employed in conjunction with aromatic oils of the type described herein in the preparation of resin-plasticizer compositions, I prefer to have the said aromatic oils as the preponderating constituent of such mixture of plasticizing agents.

It should be emphasized that aromatic oils of the type described herein may not be compatible with certain natural resin materials in all proportions. Consequently, care preferably should be exercised in using a given resin in order not to exceed the compatibility limits of the respective components if a clear coating film, or a mixture, is desired. In case a non-homogeneous mixture is obtained, the addition of a secondary plasticizing agent more completely soluble in both the resin and the aromatic oil usually will be found to result in the formation of a completely homogeneous mixture. The use of a third component, other than a plasticizing agent, as a solubilizing agent will be found to be advantageous in certain cases.

In certain cases, also, an opaque film or coating is not detrimental and may even be desired. In such cases, the use of aromatic oils of the type described in proportions above the compatibility limits is indicated.

It is apparent, therefore, that a proper choice of the type of resin and the ratio of resin to aromatic oil will enable one skilled in the art to prepare compositions possessing desired flexibility, softening point, viscosity, consistency, tackiness, and adhesiveness at will.

While any desired ratio of natural resin material to aromatic oil may be employed, for many applications, I prefer to have the resin comprise at least 50% of the resin-plasticizer mixture, although larger proportions of aromatic oil may be employed in certain applications such as, for example, in the preparation of adhesives.

Excellent results may be obtained in many cases where the resin comprises at least 70% of the resin-aromatic oil mixture.

In certain other cases such as for example in the preparation of rosin ester-aromatic oil compositions, preparations containing aromatic oil of the type described herein in excess of 50% such as from 50% to 70% (for example, 60%) may be employed to impart unusual tacky characteristics.

It is to be understood, of course, that varying quantities of aromatic oils of the type described may be employed, the quantity used, in general, depending largely upon the result desired. Thus the use of relatively large quantities of aromatic oil will increase the flexibility and extensibility of a given resin substantially while at the same time reducing its softening point somewhat.

The aromatic oil and resin may be compounded in any desired manner, such as by (1) mixing the molten resin and the aromatic oil, (2) the use of a mutual solvent, and (3) compounding at room or elevated temperature in the absence of a solvent by the use of a two-roll mill, a Banbury mixer, or otherwise. Any combination of the foregoing methods also may be employed, if desired.

In hot-melt mixing, I generally prefer to melt the resin and add the aromatic oil to the molten resin with good agitation. Other procedures may of course, be employed.

In case a solvent is incorporated in the resin-aromatic oil mixture, one which is capable of forming a clear solution preferably is chosen. However, in certain cases it may be desired to add only a sufficient quantity of solvent to reduce the melting point of the mixture, or to form a paste of varying consistency, in which case the degree of solubility of the resin and/or aromatic oil in the solvent is of less importance.

Suitable solvents may be selected from the hydrocarbons or from hydrocarbon fractions, such as benzene, toluene, xylene, solvent naphtha, mineral spirits, V. M. & P. naphtha, hydrogenated hydrocarbon solvents, and the like, chlorinated solvents, such as ethylene dichloride, chloroform, and carbon tetrachloride, and miscellaneous organic solvents, such as esters and ketones. As many of the resins are quite soluble in aromatic solvents, such solvents are preferred for the preparation of resin-aromatic oil solutions to be used in certain specific applications. However, the use of other solvents, such as petroleum hydrocarbon fractions, in admixture with aromatic solvents will be found to be satisfactory in practically all cases.

As pointed out previously, the field of usefulness of natural resin material-aromatic oil compositions may be largely increased by incorporating rubber, either natural or artificial, or derivatives or modifications thereof, in such compositions. Examples of such materials are natural rubber, such as raw plantation crepe, latex, and the like; reclaimed rubber; synthetic rubbers or elastomers, such as those obtained by the polymerization of butadiene, or other diolefines, either alone or in admixture, or the copolymerization of one or more diolefines with one or more unsaturated or reactive materials, such as styrene. methyl styrene, acrylic nitrile, isobutylene, and the like, or by the polymerization of one or more substituted diolefines, such as 2-chloro-butadiene-1,3, either alone or in admixture with other unsaturated and/or reactive materials, and other synthetic elastomers; substituted and/or modified natural and/or synthetic rubbers, such as chlorinated rubber; olefin-polysulfide type rubbers; resinified rubber, factice; and the like.

While rubber or rubber-like materials may be added to natural resin material-aromatic oil compositions in the solid state, I generally prefer to incorporate a solution of one or more of the ingredients with the remaining ingredients. An alternative method comprises blending solutions of the various components.

Rubber also may be added to the resin-aromatic oil composition, in solid form or in the form of a solution, for example in the form of a rubber cement, which generally comprises a solution of rubber in a suitable solvent, which may contain other ingredients.

The field of utilization of natural resin material-aromatic oil compositions also may be enlarged substantially by the incorporation therein of one or more drying oils.

Examples of such oils are linseed oil, tung oil, oiticica oil, perilla oil, soya bean oil, cashew nut oil, fish oil, menhaden oil, sardine oil, synthetic and/or modified drying oils, and the like. Such drying oils may be bodied prior to, during, or after the addition of the resin-aromatic oil composition. In addition, one or more of the ingredients, such as the resin, may be incorporated in the drying oil or bodied drying oil, prior to the addition of the other ingredient, or ingredients.

In case a drying oil is incorporated in the resin-aromatic oil composition, driers may be added if desired in order to assist in hardening the drying oil after application. Examples of suitable driers are the lead, cobalt, and manganese salts of high molecular weight organic acids, such as rosin acid or naphthenic acids. Litharge or other drying agents, such as japan driers, also may be employed.

Natural resin material-aromatic oil-drying oil compositions may be prepared and used without further modification, although other ingredients also may be incorporated therein, such as solvents.

Both rubber and drying oils may be incorporated in natural resin material-aromatic oil compositions for use in certain specialized applications. In general, it may be said that rubber improves the adhesive properties of the mixture, while the drying oil improves the mechanical strength and solvent resistance of the composition after applications.

As both rubber and drying oils generally are not compatible in all proportions with certain of the natural resins and natural resin derivatives of the type more particularly described herein, care should be exercised not to exceed such compatibility limits if a clear composition is desired.

Other material which may be incorporated in the natural resin material-aromatic oil compositions are cellulose derivative plastics such for example as organic esters of cellulose, such as cellulose formate, cellulose acetate, cellulose triacetate, cellulose propionate, cellulose butyrate, cellulose benzoate, and the like; mixed organic esters of cellulose, such as cellulose acetopropionate, cellulose acetobutyrate, cellulose propionate butyrate, and the like; inorganic esters of cellulose, such as cellulose nitrate; mixed organic-inorganic esters of cellulose, such as cellulose nitro-acetate; cellulose ethers, such as methyl cellulose, ethyl cellulose, benzyl cellulose, and the like; mixed cellulose ethers, such as methyl ethyl cellulose; mixed cellulose ester-ethers, such as ethyl cellulose acetate, oxyethyl cellulose acetate, and the like; other cellulosic derivatives, such as hydroxypropylcellulose triacetate; and mixtures of the foregoing.

As indicated previously, other ingredients may be added to the resin-aromatic oil composition, either alone, or in combination, or in conjunction with the addition of rubber and/or drying oil. Examples of such additives are pigments, fillers, extenders, organic dyes, antioxidants, antiskinning agents, and the like.

Suitable pigments include red lead, vermilion, cadmium red, Venetian red, chrome yellow, cadmium yellow, zinc yellow, iron yellow, ochre, umber, ultramarine blue, iron blue, emerald green, chrome green, titanium dioxide, carbon black, lampblack, iron oxide black, manganese black, lithopone, white lead, zinc white, various metallic pigments such as aluminum and bronze powders, and the like.

Examples of fillers and extenders are whiting, barytes, kaolin, blanc fixe, gloss white, asbestos, mineral wool, rock wool, and the like.

Organic colors which may be employed as additives include basic dyes such as methyl violet, Victoria blue, malachite green, brilliant green, magenta, thioflavine, auramine, and the like; acid dyes such as sulfonic or carboxylic acid derivatives of color bases; mordant dyes; and pigment dyes such as azo dyes, vat dyes, and phthalocyanine compounds.

Examples of antiskinning agents and antioxidants are dipentene, catechol, hydroquinone, and secondary aryl amines, such as phenyl alpha naphthylamine. In general, antiskinning agents and antioxidants are used only when drying oils have been incorporated in the resin-aromatic oils composition.

Waxes also may be incorporated in natural resin material-aromatic oil compositions of the type described herein, of which paraffin may be considered to be the most important. Examples of other waxes and waxy materials which may be blended with resin-aromatic oil compositions of the type herein disclosed are bayberry wax, ozokerite, Rilan wax, spermaceti, stearic acid, lanette wax, lanolin, montan wax, Japan wax, cetyl alcohol, esters of cetyl alcohol, ceresin, candelilla wax, carnauba wax, beeswax, sugar cane wax, Chinese insect wax, cottonseed wax, flaxseed wax, palm wax, wool wax, cetyl cerotate, cetyl acetate, cetyl palmitate, ethyl palmitate, lauryl laurate, methyl stearate, and glyceryl stearate. Derivatives of the foregoing, or other waxes also may be employed, such as the chlorinated paraffins.

Care should be exercised not to exceed the compatibility limits of the selected wax in the resin-aromatic oil composition if a perfectly clear composition or coating is desired.

Natural resin material-aromatic oil compositions of the type described herein are well adapted for use in a large number of industrial applications, due principally to the unique properties of the high-boiling aromatic oils employed in their preparation. Thus, such compositions may be used (1) to treat, coat, and/or impregnate fibrous materials in general, such as paper and textiles, (2) to waterproof, impregnate and/or finish leather, either natural or artificial, (3) as adhesives and binding agents, (4) to form putties, caulking agents, and sealing compounds, (5) as film forming compositions, (6) for the preparation of inks, (7) for the preparation of both hot and cold molding compositions, and (8) for the preparation of resinous and/or plastic blocks, sheets, rods, tubes, foil, filament, molding compositions and the like.

Modifying agents may be incorporated in the resin-aromatic oil compositions which are to be used for any desired application, if desired. Thus, for example, resin-aromatic oil compositions which are to be used to coat and/or impregnate fibrous materials may contain rubber, drying oils, solvents, and/or waxes.

Resin-aromatic oil compositions of the type described herein, either alone or in conjunction with certain modifying agents, are excellent waterproofing, coating, impregnating, and/or finishing agents for a wide variety of fibrous materials. Thus, for example, such compositions may be used to coat and/or impregnate felts to be used as floor, wall, or roof coverings. Such compositions frequently contain one or more pigments, coloring agents, fillers, and/or extenders.

Natural resin material-aromatic oil compositions employed to water-proof, impregnate, and/or finish leather may contain one or more waxes, and may contain solvents, pigments, and/or coloring agents.

Natural resin material-aromatic oil compositions may be employed as adhesives or binders without the addition of any modifying agents. Such adhesives usually are of the hot-melt type, that is, the resin-aromatic oil composition is softened or melted by the application of heat prior to or during its application to the surfaces to be joined.

Solvents also may be incorporated in such compositions, if desired.

The use of resin-aromatic oil compositions of the type described herein for such adhesive purposes will be found to be unusually satisfactory due mainly to the unique characteristics of the aromatic oil employed. Such compositions may be used in the fabrication of cardboard, to join paper or cardboard to form containers or other objects, for the preparation of laminated objects or units, such as laminated wood, and the like.

Such compositions will be found to be particularly useful in the fabrication of cardboard containers formed by rolling a sheet of kraft, or other, paper over a cylindrical form, the adhesive being applied continuously, or otherwise, to unite the continuous, or other, plies to form a container of the desired size and rigidity. Due to the excellent waterproofing qualities of the adhesive, the container obtained usually requires no further waterproofing, thus eliminating one operation in the manufacture of containers which are to be used for outdoor applications.

In addition, resin-aromatic oil compositions of the type described herein also may contain fillers, such as starch, asbestos, and the like, rubber, pigments, coloring agents, solvents, and similar materials. Special adhesives for specific applications may be formulated by the addition of one or more of such modifying ingredients to resin-aromatic oil compositions of the type described herein.

Natural resin material-aromatic oil compositions prepared from aromatic oils of the type described herein also find wide application in the formulation of putties, caulking agents, and sealing compounds. Putties and caulking compounds also frequently contain drying oils, fillers such as clay, bentonite, kaolin, asbestos, and the like, pigments, organic coloring agents, solvents, and similar materials.

Sealing compounds frequently contain drying oils, rubber, fillers, pigments, and the like, in addition to the resin and aromatic oil.

Resin-aromatic compositions of the type described herein are particularly well adapted for use as film forming compositions to coat a wide variety of surfaces, such as those of wood, metal, fibrous materials, ceramic materials, such as concrete, brick, stone, stucco, and plaster, and the like. Such compositions frequently are employed in the absence of any modifying agent, being applied in a softened or molten condition to the surface to be coated.

Thus, a composition comprising a natural resin material and an aromatic oil of the type described herein, may be softened or melted by the application of heat, after which it may be applied, such as by dipping, brushing, or spraying, to the surface of metallic objects, particularly those of iron or steel, to form a protective layer thereon.

Pigments or fillers may be incorporated in resin-aromatic oil coating compositions of the type disclosed herein, as well as solvents, drying oils, organic coloring agents, and the like. Sufficient pigments and fibers, such as asbestos, may be added to give composition possessing a definite fibrous structure. Such compositions usually are applied by means of a trowel, or by similar methods.

Compositions comprising an aromatic oil of the type described herein, a natural resin material and a drying oil, preferably bodied, find numerous applications in the coating industry. Such compositions may contain a solvent, preferably one of a hydrocarbon nature.

Resin-aromatic oil compositions of the type disclosed herein are excellent ink bases. Pigments and/or coloring agents usually are added, such as lampblack, Venetian red, chrome yellow, and the like. Drying oils may be incorporated in such inks and they may contain solvents, particularly those of a hydrocarbon type.

The herein-disclosed resin-aromatic oil compositions also are well adapted for use in both hot and cold molding compositions. The cold molding compositions usually contain a filler, such as asbestos, and a solvent, particularly a hydrocarbon solvent, and may contain one or more drying oils, pigments, organic coloring agents, and the like.

Other applications for resin-aromatic compositions of the type disclosed herein will, of course, suggest themselves to persons familiar with the art upon an inspection of the foregoing disclosure.

Aromatic hydrocarbon oils of the type described because of their unusually high solvent power are particularly outstanding in their ability to disperse other additives. Their low surface tension promotes unusual wetting power, which in turn, greatly adds rapid dispersion. Thus both relatively high solvent power and relatively high dispersion power combine to make aromatic oils of the type described singular and unique.

These properties are of greatest importance in plasticizing and compounding operations insuring not only the desired dispersion of the aromatic oil itself and any other additive, but also such dispersion in a relatively short time and in a relatively easy manner thus avoiding the necessity of prolonged working or milling, such as is required with many other plasticizing and softening agents. The compatibility of my aromatic oils with resins of the type under discussion is unusually outstanding, yielding products of greatly improved characteristics.

My aromatic oils in view of their higher solvency and wetting powers as compared to dibutyl phthalate and tricresyl phosphate may be incorporated in natural resin material at a considerably higher rate under the same conditions and at a pronouncedly higher rate. This greatly increases the throughput of any given manufacturing unit.

Generally speaking, lower viscosities for the same amount of material used may be obtained when using my aromatic oils. This is of outstanding importance in the formulation of cements and of coating compositions, for example, for the coating of fabrics for the same viscosity as higher content of solids or, in other words, of resins.

On the other hand, when it is desired to impart to the resin product hard, horny and tough characteristics this may be accomplished by employing my aromatic oil in combination with resin polymerized therein or by the addition of resins of other types such as, for example, a coumaron-indene resin.

An advantage in using resins which may be polymerized in the oil itself is that they possess a very high compatibility with other resins and particularly with natural resin material.

Certain of the foregoing outstanding properties of my aromatic oil are demonstrated in the following examples.

Example 4

A mixture of 70 parts of ester gum and 30 parts of an aromatic oil of the type described herein and having an initial boiling point of approximately 300° C. is heated with agitation, until a uniform mixture is obtained.

Upon applying this composition to a fibrous material, such as cloth, felt, paper, or leather, a satisfactory waterproof finish is obtained.

Example 5

Upon applying a resin-aromatic oil composition of the type described in Example 4 to a number of plies of paper in a molten condition, and uniting the plies under pressure, a laminated block of paper is secured.

Example 6

A mixture of 40 parts of hydrogenated rosin, 20 parts of bodied linseed oil, 10 parts of an aromatic oil of the type described herein and boiling above 250° C., and 30 parts of kaolin is thoroughly blended. The composition is satisfactory for use as a putty, caulking, or sealing agent.

Example 7

Upon heating a composition of the type described in Example 4 and dipping a section of steel pipe in the molten composition, a satisfactory mill coating is formed thereon.

Example 8

An ink is prepared by thoroughly blending 25 parts of an ester gum, 20 parts of carbon black, and 55 parts of an aromatic oil of the type described herein and boiling above 250° C.

Example 9

A cold molding composition may be prepared by thoroughly mixing a blend containing 20 parts of a rosin ester, 10 parts of an aromatic oil of the type described herein and boiling above 300° C., 10 parts of bodied linseed oil, 10 parts of a hydrocarbon solvent, and 50 parts of asbestos, followed by aging the mixture until the desired degree of plasticity is secured, subdividing and screening.

The molding composition may be subsequently molded and baked.

As previously pointed out, the unusually good properties possessed by natural resin material-aromatic oil compositions prepared from aromatic oils of the type disclosed herein are largely due to the unique properties of such aromatic oils. Among these desirable properties may be mentioned (1) their relatively low free carbon content and their comparative freedom from extraneous materials, (2) their excellent solubility and compatibility characteristics, (3) their relatively low viscosity and viscosity-imparting characteristics, and (4) their stability.

My natural resin material-aromatic oil compositions are particularly well adapted for the coating and/or impregnation of organic fibrous materials in general including vegetable and animal fibers such as hair, leather and the like.

For convenience in the claims the term "fabric" is used generically to include a woven, felted, knitted or other similarly fabricated material as well as the material used in its making such as organic fibers and threads. Thus, for example, paper is a fabric prepared by felting paper-making fibers. Textile fabrics are prepared by weaving or knitting. A thread is a fabric made by spinning or twisting fibers, yarns and filaments.

In the specification and in the claims, the term "aromatic oil" unless otherwise modified, is intended to include the unrefined or refined oil separated from tar formed during the production of combustible gas by processes involving the pyrolytic decomposition of petroleum oil with or without the aid of catalysts, as well as mixtures of such aromatic oil with the unsaturated aromatic hydrocarbons derived from the same source and/or the resinous polymers derived therefrom.

In the specification and claims the term "running" is intended to mean the heating of a natural resin or resinous natural resin derivative with resulting partial depolymerization and lowering of the softening point, or increase in drying oil compatibility, or both.

The term hardening is intended to mean an increase in the softening point of the resinous material, such as by the partial oxidation of the natural resin or resinous natural resin derivative.

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. A new composition of matter comprising one of a group consisting of natural resins, esters of natural resins and hydrogenated esters of natural resins and as a plasticizer for said resin in aromatic oil having an aromatic hydrocarbon content of at least 95% and boiling above 210° C., said oil containing a plurality of oily aromatic hydrocarbons and having been physically separated from other components including pitch components of petroleum tar produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

2. A new composition of matter comprising one of a group consisting of natural resins, esters of natural resins and hydrogenated esters of natural resins and as a plasticizer for said resin an aromatic oil having an aromatic hydrocarbon content of at least 95% and boiling above 250° C., said oil containing a plurality of oily aromatic hydrocarbons and having been physically separated from other components including pitch components of petroleum tar, said tar having been produced in the vapor phase pyrolysis at average temperatures above 1300° F. of naphthenic petroleum oil in the production of combustible gas, in the composition the resin and aromatic oil being included in the reciprocal proportions of 30% to 70% of one and 70% to 30% of the other.

3. A new composition of matter comprising one of a group consisting of natural resins, esters of natural resins and hydrogenated esters of natural resins and as a plasticizer for said resin an aromatic oil having an aromatic hydrocarbon content of at least 97% and boiling between 325° C. and 450° C., said oil containing a plurality of oily aromatic hydrocarbons and having been physically separated from other components including pitch components of petroleum tar emulsion produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

4. A new composition of matter comprising a natural resin and as a plasticizer for said resin an aromatic oil having an aromatic hydrocarbon content of at least 95% and a density of at least 0.95 and boiling above 250° C., said oil containing a plurality of oily aromatic hydrocarbons and having been physically separated from other components of petroleum oil gas tar including pitch components thereof, said tar having been produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

5. A new composition of matter comprising an ester of a natural resin and as a plasticizer for said resin ester an aromatic oil having an aromatic hydrocarbon content of at least 95% and having a density of at least 0.95 and boiling above 250° C., said oil containing a plurality of oily aromatic hydrocarbons and having been physically separated from other components of petroleum oil gas tar including pitch components thereof, said tar having been produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

6. A new composition of matter comprising rosin ester and as a plasticizer for the said rosin ester an aromatic oil containing a plurality of oily aromatic hydrocarbons and boiling above 250° C., said oil having an aromatic hydrocarbon content of at least 97% and having a density of at least 0.98 said oil having been physically separated from other components of petroleum oil gas tar including pitch components thereof, said tar having been produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

7. A new composition of matter comprising ester gum and as a plasticizer for the said ester gum an aromatic oil containing a plurality of oily aromatic hydrocarbons and boiling above 275° C., said oil having an aromatic hydrocarbon content of at least 97% and having a density of at least 0.98 and having been physically separated from other components of petroleum oil gas tar including pitch components thereof, said tar having been produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

8. A new composition of matter comprising a fossil natural resin and as a plasticizer for the said resin an aromatic oil containing a plurality of oily aromatic hydrocarbons and boiling above 250° C., said oil having an aromatic hydrocarbon content of at least 97% and having a density of at least 0.98 and having been physically separated from other components of petroleum oil gas tar including pitch components thereof, said tar having been produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

9. A new composition of matter comprising a kauri resin and as a plasticizer for the said resin and aromatic oil containing a plurality of oily aromatic hydrocarbons and boiling above 250° C., said oil having an aromatic hydrocarbon content of at least 97% and having a density of at least 0.98 and having been physically separated from other components of petroleum oil gas tar including pitch components thereof, said tar having been produced in the vapor phase pyrolysis at average temperatures above 1300° F. of petroleum oil in the production of combustible gas, in the composition the resin and aromatic oil being included in the reciprocal proportion of 30% to 70% of one and 70% to 30% of the other.

10. A new composition of matter comprising a hydrogenated ester of a natural resin and as a plasticizer for said hydrogenated resin ester an aromatic oil containing a plurality of oily aromatic hydrocarbons and boiling above 250° C., said oil having an aromatic hydrocarbon content of at least 95% and having a density of at least 0.95 and having been physically separated from other components of petroleum oil gas tar including pitch components thereof, said tar having been produced in the vapor phase pyrolysis at average temperatures above 1300° F. of petroleum oil in the production of combustible gas, in the composition the resin and aromatic oil being included in the reciprocal proportions of 30% to 70% of one and 70% to 30% of the other.

11. A new composition of matter comprising one of a group consisting of natural resins, esters of natural resins and hydrogenated esters of natural resins, a drying oil, and as a plasticizer for said resin an aromatic oil containing a plurality of oily aromatic hydrocarbons and boiling above 275° C., said aromatic oil having an aromatic hydrocarbon content of at least 97% and having been separated from other constituents of petroleum oil gas tar including pitch constituents thereof, said tar having been produced in the vapor phase pyrolysis at temperatures above 1300° F. of petroleum oil in the production of combustible gas, in the composition the resin and aromatic oil being included in the reciprocal proportions of 30% to 70% of one and 70% to 30% of the other.

FRANK J. SODAY.

REFERENCES CITED

The following references are of record in the file of this patent:

UNITED STATES PATENTS

| Number | Name | Date |
| --- | --- | --- |
| 2,217,988 | Lawson | Oct. 15, 1940 |
| 2,150,641 | Thomas | Mar. 14, 1939 |
| 559,376 | Gentzsch | May 5, 1896 |

OTHER REFERENCES

Vapor Phase Cracking, Groll, Industrial and Engineering Chemistry, vol. 25, No. 7, July 1933, page 797.